United States Patent
Katsurahira

(10) Patent No.: US 10,055,035 B2
(45) Date of Patent: Aug. 21, 2018

(54) POSITION DETECTING DEVICE AND POSITION INDICATOR THEREOF

(71) Applicant: Wacom Co., Ltd., Saitama (JP)

(72) Inventor: Yuji Katsurahira, Saitama (JP)

(73) Assignee: Wacom Co., Ltd., Saitama (JP)

( * ) Notice: Subject to any disclaimer, the term of this patent is extended or adjusted under 35 U.S.C. 154(b) by 93 days.

(21) Appl. No.: 15/063,388

(22) Filed: Mar. 7, 2016

(65) Prior Publication Data

US 2016/0188009 A1 Jun. 30, 2016

Related U.S. Application Data

(63) Continuation of application No. PCT/JP2014/073898, filed on Sep. 10, 2014.

(30) Foreign Application Priority Data

Sep. 27, 2013 (JP) ................. 2013-200910

(51) Int. Cl.
*G06F 3/033* (2013.01)
*G06F 3/038* (2013.01)
(Continued)

(52) U.S. Cl.
CPC .......... *G06F 3/0383* (2013.01); *G06F 1/3215* (2013.01); *G06F 3/033* (2013.01);
(Continued)

(58) Field of Classification Search
CPC ............... G06F 1/3215; G06F 3/03545
(Continued)

(56) References Cited

U.S. PATENT DOCUMENTS

| 8,089,008 B2 | 1/2012 | Katsurahira |
| 8,094,140 B2 | 1/2012 | Katsurahira et al. |

(Continued)

FOREIGN PATENT DOCUMENTS

| JP | 05-40568 A | 2/1993 |
| JP | 07-182090 A | 7/1995 |

(Continued)

OTHER PUBLICATIONS

International Search Report dated Dec. 2, 2014, for corresponding International Application No. PCT/JP2014/073898, 4 pages.

*Primary Examiner* — Roy P Rabindranath
(74) *Attorney, Agent, or Firm* — Seed IP Law Group LLP

(57) ABSTRACT

A remaining amount of power stored in a position indicator can be recognized at plural levels. The position indicator includes a power storage device, an alternating current (AC) signal generating circuit that generates an AC signal to be transmitted toward a tablet, a modulation circuit that modulates the AC signal according to position indicator information represented by a binary code, and an electricity remaining amount detecting circuit that detects an electricity remaining amount of the power storage device. The frequency at which a specific bit of the position indicator information is set to 0 or 1 is changed according to the detected electricity remaining amount. The tablet includes a receiver that receives the position indicator information from the position indicator, and detects the electricity remaining amount of the power storage device from the frequency at which the specific bit of the received position indicator information is 0 or 1.

16 Claims, 11 Drawing Sheets

(51) Int. Cl.
*G06F 3/0354* (2013.01)
*G06F 3/046* (2006.01)
*G06F 1/32* (2006.01)
*G06F 3/14* (2006.01)

(52) U.S. Cl.
CPC .......... *G06F 3/038* (2013.01); *G06F 3/03545* (2013.01); *G06F 3/046* (2013.01); *G06F 3/14* (2013.01)

(58) Field of Classification Search
USPC ........................................................ 345/179
See application file for complete search history.

(56) References Cited

U.S. PATENT DOCUMENTS

| | | | |
|---|---|---|---|
| 8,373,683 B2 | 2/2013 | Katsurahira et al. | |
| 8,872,805 B2 | 10/2014 | Matsumoto | |
| 8,884,932 B2 | 11/2014 | Fukushima et al. | |
| 2007/0146351 A1* | 6/2007 | Katsurahira | G06F 3/03545 345/179 |
| 2007/0273617 A1* | 11/2007 | Yamakawa | G09G 3/22 345/75.2 |
| 2009/0065268 A1 | 3/2009 | Katsurahira | |
| 2010/0277327 A1* | 11/2010 | Lee | G06F 1/30 340/636.16 |
| 2010/0321288 A1 | 12/2010 | Katsurahira et al. | |
| 2011/0234549 A1 | 9/2011 | Matsumoto | |
| 2012/0127132 A1 | 5/2012 | Katsurahira et al. | |
| 2013/0241897 A1 | 9/2013 | Fukushima et al. | |

FOREIGN PATENT DOCUMENTS

| | | |
|---|---|---|
| JP | 2007-164356 A | 6/2007 |
| JP | 2009-070004 A | 4/2009 |
| JP | 2011-204173 A | 10/2011 |
| JP | 2013-191168 A | 9/2013 |

* cited by examiner

VOLTAGE OF ELECTRIC DOUBLE-LAYER CAPACITOR AND NUMBER OF TIMES OF PULSE

FIG. 6

X-AXIS WHOLE-SURFACE SCAN OPERATION OF FIRST EMBODIMENT

SELECTED ELECTRODE: X1 X2 X3 X4 X5 X6 X7 X8 X9 X10 X11 X12 X13 X14 X15 X16 ...... X30 X31 X32 X33 X34 X35 X36 X37 X38 X39 X40

DETECTION OUTPUT SIGNAL

OPERATION OF POSITION INDICATOR ACCORDING TO THIRD EMBODIMENT

CONFIGURATION DIAGRAM OF TABLET ACCORDING TO THIRD EMBODIMENT

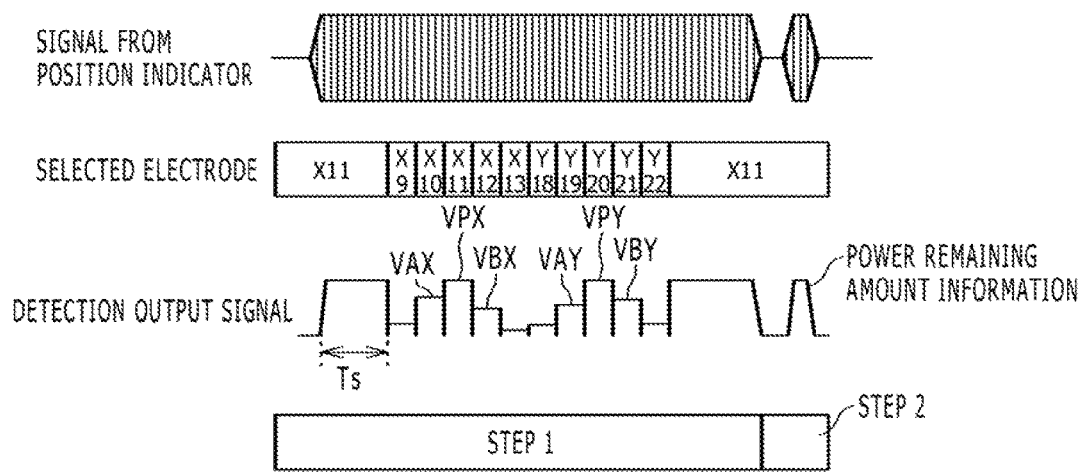

POSITION DETECTING DEVICE AND POSITION INDICATOR THEREOF

BACKGROUND

Technical Field

The present disclosure relates to a position detecting device that detects a position indicated by a position indicator.

Description of the Related Art

Prior to this application, the present applicant has made a proposal about a position detecting device that uses an electric double-layer capacitor as a power supply for a position indicator and the position indicator thereof in advance (Patent Document 1 (refer to Japanese Patent Laid-Open No. 2007-164356)). According to the position detecting device of Patent Document 1, the electric double-layer capacitor of the position indicator can be charged at high speed in several seconds to several tens of seconds. However, to reduce the size of the position indicator, charge operations need to be carried out comparatively frequently because a limit exists to the capacitance of the electric double-layer capacitor that can be mounted.

In the invention of Patent Document 1, in order to prevent the stop of the operation of the position indicator in the middle of working, when the voltage of the electric double-layer capacitor has decreased to a certain voltage or lower, information indicating that is transmitted so that the operator can recognize that.

PRIOR ART DOCUMENT

Patent Document

Patent Document 1: Japanese Patent Laid-Open No. 2007-164356

BRIEF SUMMARY

Technical Problem

On the other hand, there is a demand to know a remaining amount of power supply stored in the position indicator (electricity remaining amount) at plural levels in order to efficiently perform a charge in the middle of working.

It is an object of the present disclosure, in regards to the problem, to provide a position detecting device with which the remaining amount of power supply stored in a position indicator can be recognized at plural levels.

Technical Solution

In the present disclosure, in order to achieve the above-described object, the following position detecting device is proposed. Specifically, a position indicator is provided with a power storage according to a battery or an electric double-layer capacitor, an alternating current (AC) signal generating circuit, an electricity remaining amount detecting circuit that detects an electricity remaining amount of the power storage, and information transmitting means that transmits, to a tablet, remaining amount information having change frequency according to the detected electricity remaining amount. The tablet is provided with information receiving means that receives the remaining amount information from the position indicator, and detects the electricity remaining amount of the power storage according to the change frequency of the remaining amount information that is received.

Furthermore, the following position detecting device is proposed. Specifically, a position indicator is provided with an electric double-layer capacitor, a charge circuit that charges the electric double-layer capacitor, a voltage conversion circuit that is a circuit that converts a voltage stored in the electric double-layer capacitor to a predetermined voltage and generates the predetermined voltage by using at least one switch, and a voltage detecting circuit that detects whether a voltage output by the voltage conversion circuit reaches a predetermined value. The position indicator is further provided with a voltage control circuit that supplies a pulse signal to the switch when a detection result by the voltage detecting circuit does not reach the predetermined value, an AC signal generating circuit that generates an AC signal to be transmitted toward a tablet, a counter circuit that counts number of times of transmission of the pulse signal output by the voltage control circuit, and a modulation circuit that modulates the AC signal according to position indicator information represented by a binary code. The modulation circuit is so controlled that a specific bit of the position indicator information is set to 0 or 1 every time the number of times of pulse transmission counted by the counter circuit reaches a predetermined number of times. The tablet detects an electricity remaining amount of the electric double-layer capacitor according to frequency at which the specific bit of the position indicator information is 0 or 1.

Advantageous Effects

According to the present disclosure, the remaining amount information of the power supply transmitted from the position indicator is represented at plural levels. Thus, how long the position indicator can be further used without a charge can be inferred and a charge can be efficiently performed in the middle of working.

Furthermore, it suffices to only add one bit as information transmitted from the position indicator and the sampling rate of the coordinates and the writing pressure is not lowered.

BRIEF DESCRIPTION OF THE SEVERAL VIEWS OF THE DRAWINGS

FIG. 6 is a diagram showing X-axis whole-surface scan operation in a position detecting device of the first embodiment of the present disclosure.

FIG. 15 is a diagram showing operation of detecting the position indicator according to the third embodiment of the present disclosure.

DETAILED DESCRIPTION

First Embodiment

Figure 1:
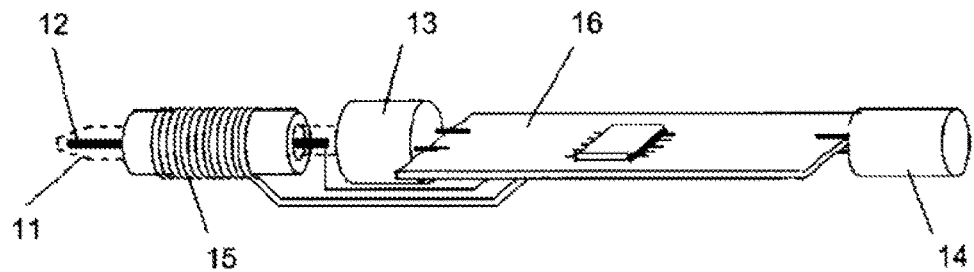
FIG. 1 is a diagram showing the internal structure of a position indicator according to a first embodiment of the present disclosure.

FIG. 1 is a diagram showing the internal structure of a position indicator in a first embodiment of the present disclosure. In the present embodiment, a pen-shaped position indicator with which a coordinate position is obtained according to capacitive coupling with a tablet will be shown. In this specification, the position detecting device is a device composed of the tablet and the position indicator, and the tablet is a device (pointing device) that reads the position of a dedicated electronic pen or another pen-shaped object (including a finger) by a sensor incorporated in the tablet.

In FIG. 1, 11 is a pen core, 12 is an electrode embedded inside the pen core 11, and 13 is a variable-capacitance capacitor that is physically connected to the pen core 11 and has a capacitance that changes according to a writing pressure applied to the pen core 11. 14 is an electric double-layer capacitor, 15 is a coil for charging the electric double-layer capacitor 14 in a contactless manner, and 16 is a printed board.

Figure 2:
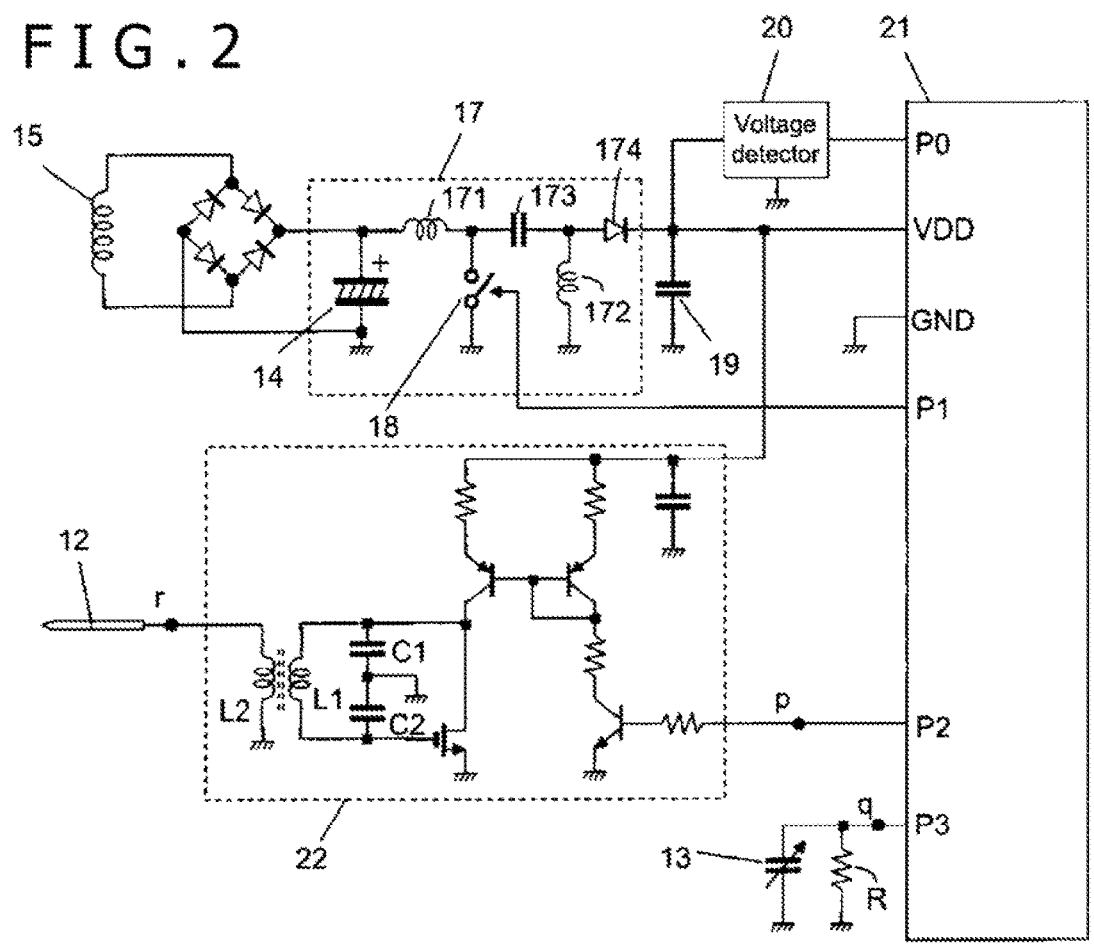
FIG. 2 is a diagram showing the circuit configuration of the position indicator according to the first embodiment of the present disclosure.

FIG. 2 is a diagram showing the circuit configuration of the position indicator according to the first embodiment of the present disclosure and the same component as that in FIG. 1 is given the same numeral. Specifically, 12 is the electrode, 13 is the variable-capacitance capacitor, 14 is the electric double-layer capacitor, and 15 is the coil. 17 is a voltage conversion circuit and it is composed of coils 171 and 172, a capacitor 173, a diode 174, and a switch 18. The voltage conversion circuit 17 is a well-known voltage conversion circuit called a single-ended primary-inductor converter (SEPIC). It can carry out both boosting and bucking and generates a constant voltage from a power supply stored in the electric double-layer capacitor 14 to store the voltage in a capacitor 19. In the present embodiment, description will be made according to the assumption that the constant voltage stored in the capacitor 19 is 1.5 V (volts).

20 is a voltage detector. It outputs a high level (the same voltage as an input voltage) when the input voltage is equal to or higher than 1.5 V and outputs a low level (0 V) when the input voltage does not reach 1.5 V. 21 is a microprocessor and it operates by using the voltage stored in the capacitor 19 as a power supply.

22 is an oscillation circuit and it generates a signal of the resonant frequency of a resonant circuit composed of a coil L1 and two capacitors C1 and C2. The signal generated by the oscillation circuit 22 is boosted by a transducer composed of the coil L1 and a coil L2 and is supplied to the electrode 12. The oscillation circuit 22 operates by the power supply stored in the capacitor 19.

A control signal p is supplied from an output terminal P2 of the microprocessor 21 to the oscillation circuit 22 and amplitude shift keying (ASK) modulation is carried out in the oscillation circuit 22 according to the level of the control signal p. Specifically, the microprocessor 21 changes the output terminal P2 to a high level or a low level at a predetermined timing to be described later. The oscillation circuit 22 carries out oscillation when the output terminal P2 is at the high level and stops the oscillation when the output terminal P2 is at the low level.

A resistor R is connected in parallel to the variable-capacitance capacitor 13 and its one end is connected to an input-output terminal P3 of the microprocessor 21. When the input-output terminal P3 is in the output state, a high level is output to the input-output terminal P3 and therefore the variable-capacitance capacitor 13 is charged to 1.5 V. When the input-output terminal P3 is in the input state, the input-output terminal P3 is in a high-impedance state and thus the charge stored in the variable-capacitance capacitor 13 is slowly discharged through the resistor R connected in parallel. Therefore, the voltage of the input-output terminal P3 gradually decreases. When the input-output terminal P3 is in the input state, regarding the input-output terminal P3, the microprocessor 21 operates as a comparator that compares the voltage of the input-output terminal P3 with a constant threshold Vth. Description will be made according to the assumption that the threshold Vth is half the supply voltage, i.e. 0.75 V, in the present embodiment.

Figure 3:
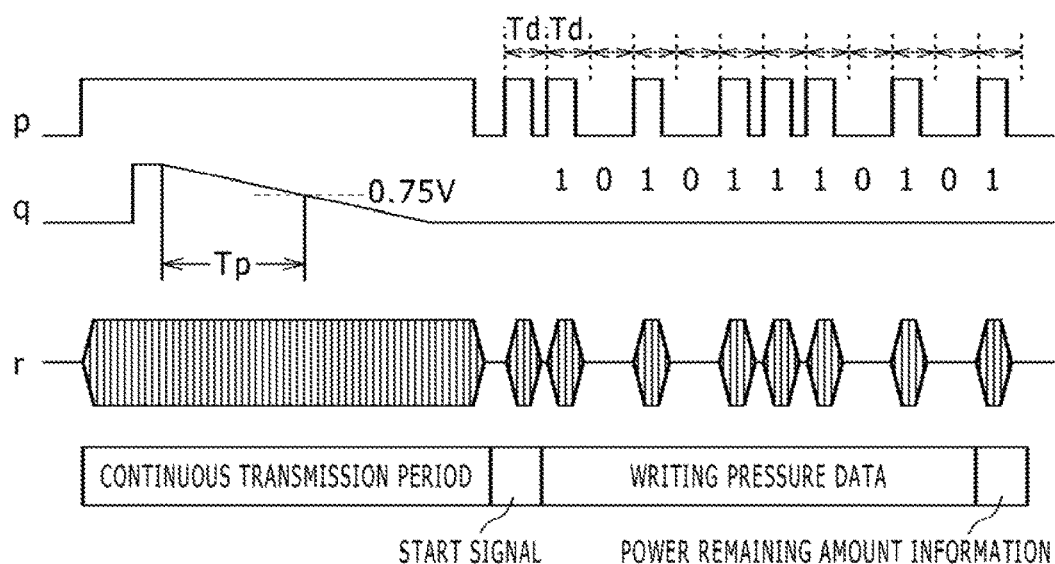
FIG. 3 is a diagram showing the operation of the position indicator according to the first embodiment of the present disclosure.

FIG. 3 is a diagram showing the operation of the present embodiment and shows how the signal (p), a signal (q), and a signal (r) in FIG. 2 change. The microprocessor 21 carries out control to cause the terminal P2 (signal (p)) to keep the high level for a certain period. As a result, the signal (r) is radiated from the electrode 12 for the certain period continuously (continuous transmission period in FIG. 3). In this continuous transmission period, the microprocessor 21 controls the input-output terminal P3 and obtains the writing pressure applied to the variable-capacitance capacitor 13. Specifically, the microprocessor 21 sets the input-output terminal P3 to the output state to charge the variable-capacitance capacitor 13.

Subsequently, the microprocessor 21 switches the input-output terminal P3 to the input state. At this time, the charge stored in the variable-capacitance capacitor 13 is discharged by the resistor R connected in parallel to the variable-capacitance capacitor 13 and thus the voltage of the variable-capacitance capacitor 13 (q) gradually decreases. A time Tp from the switching of the terminal P3 to the input state to the decrease in the voltage (q) to 0.75 V or lower is obtained. Because the variable-capacitance capacitor 13 has capacitance according to the writing pressure applied to the pen core 11, this time Tp corresponds to the writing pressure to be obtained. In the present embodiment, the microprocessor 21 obtains the writing pressure as a 10-bit value (binary code).

Upon ending this continuous transmission period, the microprocessor 21 carries out ASK modulation by controlling the terminal P2 (signal (p)) to the high level or the low level at a predetermined cycle (Td). At this time, the terminal P2 is invariably set to the high level at the first round of the predetermined cycle (Td) (start signal in FIG. 3). This is for allowing the tablet side to accurately determine subsequent data transmission timing.

Subsequently to the start signal, pieces of transmission data of 11 bits are sequentially transmitted. In these pieces of 11-bit transmission data, pieces of 10-bit writing pressure data obtained by the above-described operation and electricity remaining amount information represented by one bit to be described later are included. When the transmission data (binary code) is "0," the terminal P2 is controlled as the low level. When the transmission data (binary code) is "1," the terminal P2 is controlled as the high level. In FIG. 3, a case in which the writing pressure data to be transmitted is "1010111010" and the data of the electricity remaining amount information is "1" is shown.

In the present embodiment, the operation of FIG. 3 is repeatedly carried out. Simultaneously with the above-described operation, the microprocessor 21 controls an output terminal P1 so that the voltage stored in the capacitor 19 may be a constant voltage (1.5 V).

Specifically, the microprocessor 21 periodically detects the voltage of an input terminal P0. As described above, the voltage detector 20 outputs the high level (the same voltage as the input voltage) when the voltage of the capacitor 19 is equal to or higher than 1.5 V, and outputs the low level (0 V) when the voltage does not reach 1.5 V. Therefore, if a detection result by the input terminal P0 is the low level, the microprocessor 21 outputs a pulse signal from the output terminal P1 to the switch 18. The charge stored in the electric double-layer capacitor 14 is moved to the capacitor 19 by this pulse signal and thus the voltage of the capacitor 19 rises. The amount of charge that moves by one time of the pulse at this time is larger when the voltage of the electric double-layer capacitor 14 is higher. On the other hand, consumption from the power supply stored in the capacitor 19 is almost constant. Therefore, the microprocessor 21 increases the frequency of the pulse transmitted from the output terminal P1 as the remaining amount of the charge stored in the electric double-layer capacitor 14 becomes smaller.

Figure 4:
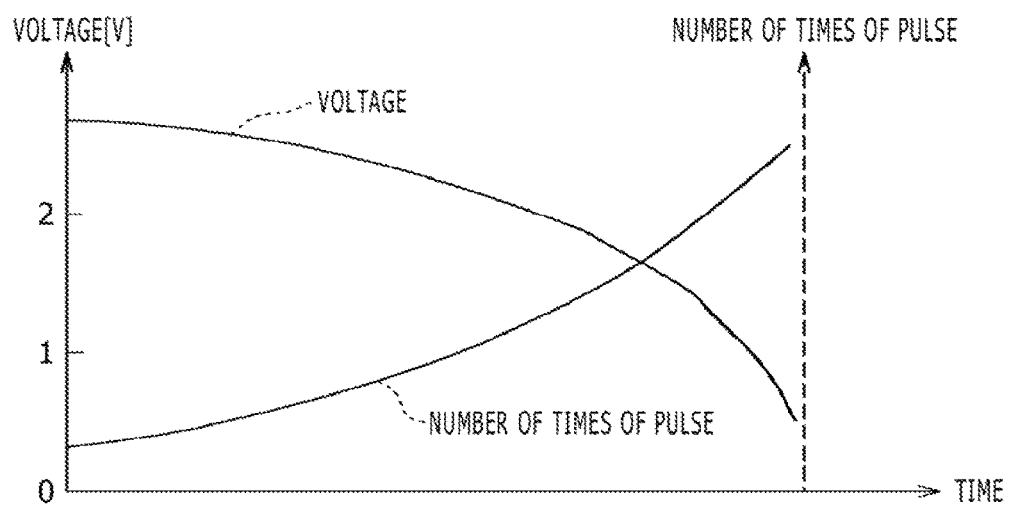
FIG. 4 is a diagram showing the relationship between the voltage of an electric double-layer capacitor and the number of times of pulse generation.

FIG. 4 is a diagram showing the relationship between the voltage of the electric double-layer capacitor and the number of times of pulse generation of the pulse transmitted from the output terminal P1 of the microprocessor 21. Every time the pulse transmitted from the output terminal P1 reaches a certain number of times (e.g. 40 times), the microprocessor 21 transmits the electricity remaining amount information (binary code) shown in FIG. 3 as "1." Furthermore, the microprocessor 21 transmits the electricity remaining amount information as "0" if the pulse transmitted from the output terminal P1 does not reach the certain number of times by the time the microprocessor 21 outputs the data of the electricity remaining amount information in FIG. 3. Therefore, the frequency at which the electricity remaining amount information is transmitted as "1" is low immediately after the electric double-layer capacitor 14 is fully charged, and the frequency at which the electricity remaining amount information is transmitted as "1" becomes higher as the time elapses and the remaining amount of the power stored in the electric double-layer capacitor 14 becomes smaller.

That is, the remaining amount of the power stored in the electric double-layer capacitor 14 is according to the frequency at which the electricity remaining amount information is transmitted as "1." Therefore, by detecting the frequency at which this electricity remaining amount information is transmitted as "1," the remaining amount of the power supply stored in the position indicator can be recognized at plural levels according to the detected frequency. In this case, it is obvious that the remaining amount of the power stored in the position indicator can be recognized in the microprocessor 21 of the position indicator. Therefore, through provision of a display device, the remaining amount of the power can be displayed in the position indicator itself. Furthermore, in the tablet that receives the electricity remaining amount information, by detecting the frequency of reception of the electricity remaining amount information transmitted as "1" from the position indicator, the remaining amount of the power stored in this position indicator can be recognized. Thus, the remaining amount of the power supply of the position indicator can be displayed on a display screen.

Figure 5:
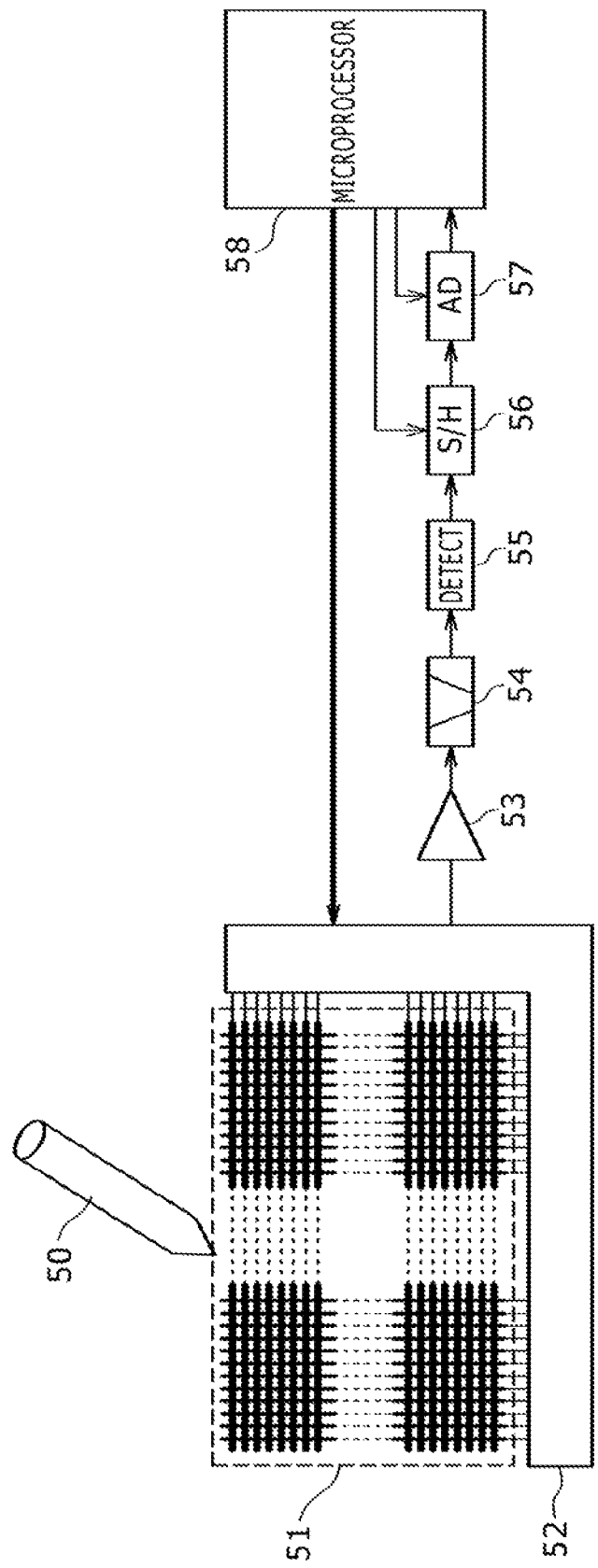
FIG. 5 is a diagram showing the configuration of a tablet according to the first embodiment of the present disclosure.

FIG. 5 is a diagram showing the configuration of the tablet used in the present embodiment. In FIG. 5, 50 is the position indicator shown in FIGS. 1 and 2, and 51 is a tablet sensor including transparent glass as a base material. A group of X-electrodes arranged in the X-direction is provided on the front surface of the tablet sensor 51 and a group of Y-electrodes arranged in the Y-direction orthogonal to the X-direction is provided on the back surface. These X-electrode group and Y-electrode group are formed as transparent electrodes by e.g. indium tin oxide (ITO). Furthermore, the tablet sensor 51 is displayed on a display device that is not diagrammatically shown and is so configured that a display place thereof can be directly input by the position indicator 50. 52 is a selection circuit that selects one electrode among the X-electrode group and the Y-electrode group. In the present embodiment, description will be made according to the assumption that the X-electrodes are 40 electrodes (X1 to X40) and the Y-electrodes are 30 electrodes (Y1 to Y30). The electrode selected by the selection circuit 52 is connected to an amplification circuit 53 and a signal from the position indicator 50 is detected by the selected electrode and is amplified by the amplification circuit 53.

The output of the amplification circuit 53 is supplied to a band-pass filter circuit 54 and only the frequency component transmitted from the position indicator 50 is extracted. An output signal of the band-pass filter circuit 54 is detected by a detection circuit 55. An output signal of the detection circuit 55 is supplied to a sample/hold circuit 56 and is sampled and held at a predetermined timing. Then, the signal is converted to a digital value by an analog to digital (AD) conversion circuit 57. This digital data is read and processed by a microprocessor 58.

The microprocessor 58 includes a read only memory (ROM) and a random access memory (RAM) inside it. In addition, the microprocessor 58 operates according to a program stored in the ROM and transmits a control signal to each of the sample/hold circuit 56, the AD conversion circuit 57, and the selection circuit 52.

FIG. 6 is a diagram showing X-axis whole-surface scan operation for obtaining an approximate X-direction position of the position indicator 50 on the tablet sensor 51. The microprocessor 58 transmits a control signal that causes selection of the electrode X1 to the selection circuit 52 and reads data output from the AD conversion circuit 57 at the time as a signal level. Similarly, the microprocessor 58 reads the signal level while sequentially switching the selection by the selection circuit 52 to the electrodes X2, X3, X4 and so on. At this time, if the detected signal level is lower than a predetermined value with all electrodes of the electrodes X1 to X40, the microprocessor 58 determines that the position indicator 50 does not exist over the tablet sensor 51 and repeats the operation of FIG. 6. If a signal at a level equal to or higher than the predetermined value is detected from any electrode of the electrodes X1 to X40, the microprocessor 58 stores the number of the X-electrode from which the highest signal level is detected (in FIG. 6, the electrode X11).

Figure 7:
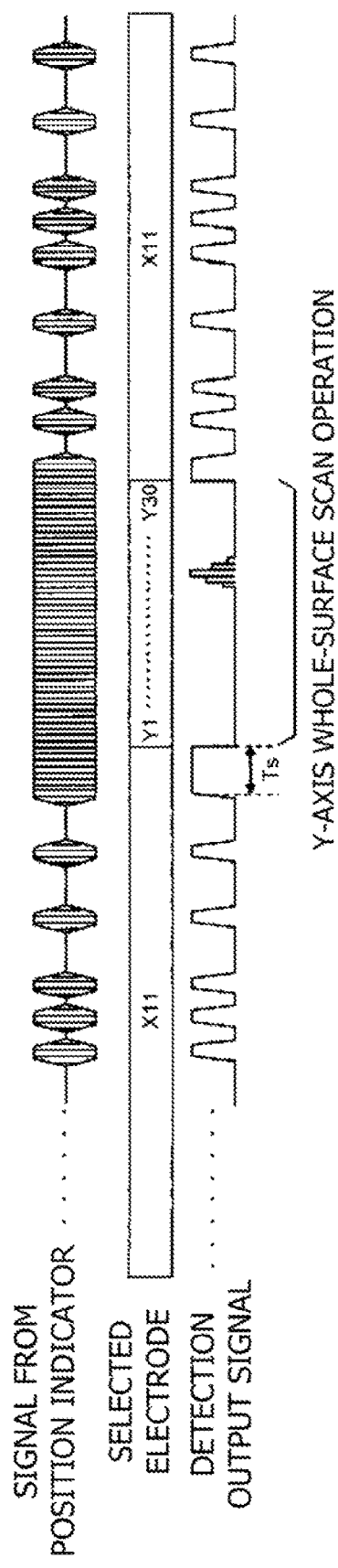
FIG. 7 is a diagram showing transition operation to a partial scan in the position detecting device of the first embodiment of the present disclosure.

After it has proven that the position indicator 50 exists near the electrode X11, the microprocessor 58 carries out transition operation to a partial scan like one shown in FIG. 7. The transition operation to a partial scan is operation for allowing the microprocessor 58 to synchronize the timing with the operation of the position indicator 50 by detecting the start time of the period of the continuous transmission from the position indicator 50 when the position indicator 50 repeats operation like that shown in FIG. 3 and to obtain an approximate position about the Y-electrodes (Y1 to Y30).

In FIG. 7, the microprocessor 58 transmits a control signal to the selection circuit 52 to select the electrode X11 obtained in the above-described X-axis whole-surface scan operation. At this time, a signal corresponding to a signal transmitted from the position indicator 50 is induced to the electrode X11 and a voltage corresponding to the signal level thereof is generated in the detection circuit 55. The microprocessor 58 operates the sample/hold circuit 56 and the AD conversion circuit 57 at a constant cycle to read the signal level. This cycle at which the sample/hold circuit 56 and the AD conversion circuit 57 are operated is set to a time sufficiently shorter than the cycle (Td) of the transmission by the position indicator 50 in the data transmission period.

When the signal level output by the AD conversion circuit 57 is equal to or higher than a predetermined value for a certain time (Ts) continuously, the microprocessor 58 determines that the continuous transmission period of the position indicator 50 is started and makes transition to Y-axis whole-surface scan operation (FIG. 7). The time (Ts) is set to a time sufficiently longer than the cycle (Td) of the transmission by the position indicator 50 in the data transmission period.

The microprocessor 58 controls the selection circuit 52 to sequentially select the electrodes from Y1 to Y30, and reads the signal level from the AD conversion circuit 57. At this time, the microprocessor 58 stores the electrode from which the highest signal level is detected. In the present embodiment, description will be made according to the assumption that the highest signal level is detected from the electrode Y20.

After the selection circuit 52 selects the last electrode Y30 and the detection of the signal level ends, the microprocessor 58 carries out operation for waiting for the end of the period of the continuous transmission from the position indicator 50. The microprocessor 58 carries out control to cause the selection circuit 52 to select the electrode X11. At this time, if the transmission from the position indicator 50 continues, a signal at a level equal to or higher than the above-described predetermined value is detected in the microprocessor 58. The time at which the received signal level falls below the predetermined value is the end time of the continuous transmission from the position indicator 50. Subsequently, the position indicator 50 enters the data transmission period. However, because the detailed position of the position indicator 50 in the tablet sensor 51 has not been obtained at this time, the microprocessor 58 does not read data here and makes transition to partial scan operation shown in FIG. 8.

Figure 8:
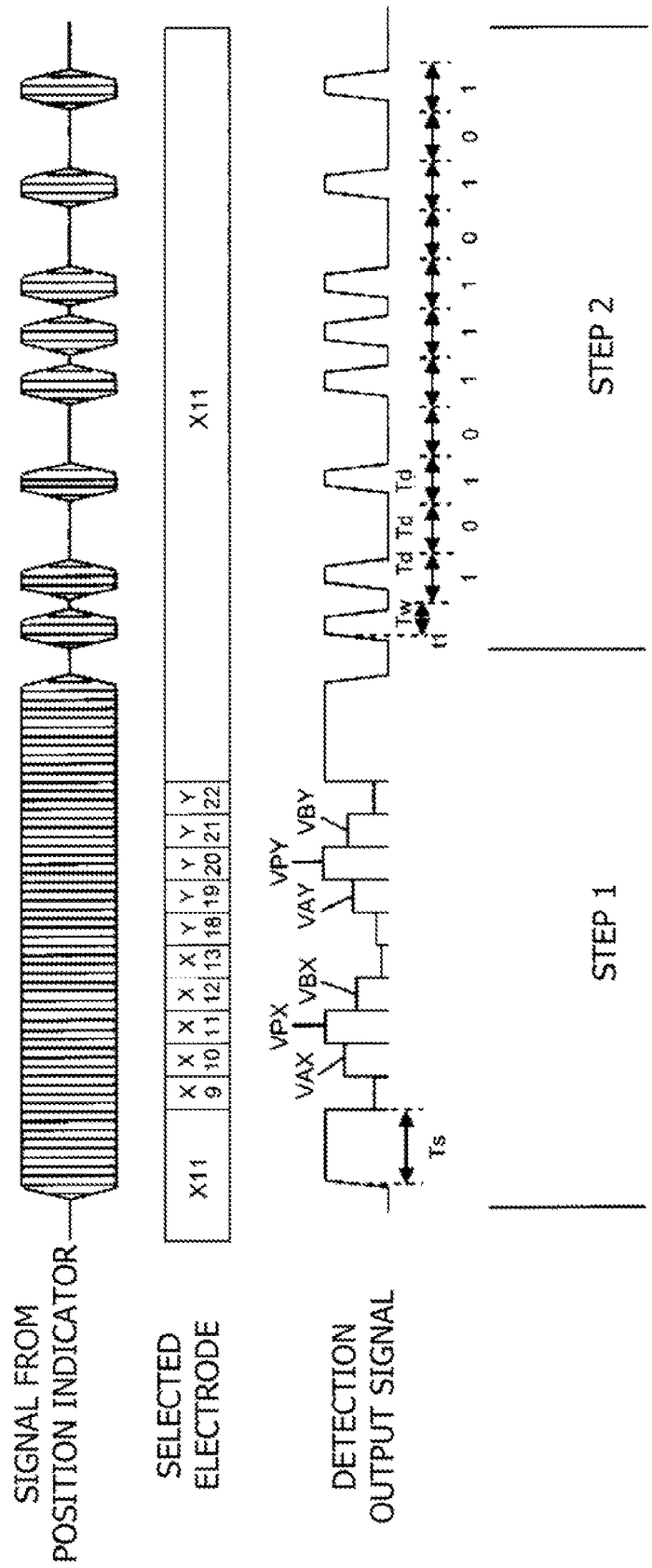
FIG. 8 is a diagram showing partial scan operation in the position detecting device of the first embodiment of the present disclosure.

In the state in which the electrode X11 is selected, when the signal level output from the AD conversion circuit 57 is equal to or higher than the predetermined value for the certain time (Ts) continuously, the microprocessor 58 determines that the continuous transmission period of the position indicator 50 is started and makes transition to coordinate detection operation (step 1 in FIG. 8). The time (Ts) is the same as that described in FIG. 7 and is set to a time sufficiently longer than the cycle (Td) of the transmission by the position indicator 50 in the data transmission period.

In order to obtain the X-coordinate of the signal from the position indicator 50, the selection circuit 52 sequentially selects five electrodes centered at the electrode X11 (X9 to X13) and the microprocessor 58 operates the AD conversion circuit 57 to read the signal level (step 1). At this time, the microprocessor 58 stores the number of the electrode from which the highest signal level is detected (here, X11), the signal level thereof (VPX), and levels VAX and VBX detected with both adjacent electrodes of this electrode (step 1).

Next, in order to obtain the Y-coordinate of the signal from the position indicator 50, the selection circuit 52 sequentially selects five electrodes centered at the electrode Y20 (Y18 to Y22) and the microprocessor 58 reads the signal level (step 1). At this time, the microprocessor 58 stores the number of the electrode from which the highest signal level is detected (here, Y20), the signal level thereof (VPY), and levels VAY and VBY detected with both adjacent electrodes of this electrode (step 1). The signal levels VPX, VAX, VBX, VPY, VAY, and VBY obtained here are used for calculation of coordinate values according to calculation expressions to be described later.

Subsequently, the microprocessor 58 carries out operation for waiting for the end of the period of the continuous transmission from the position indicator 50. The microprocessor 58 carries out control to cause the selection circuit 52 to select the electrode X11, from which a peak is detected in the above-described coordinate detection operation. At this time, the time at which the received signal level falls below the predetermined value is the end time of the continuous transmission from the position indicator 50 (step 1).

Upon detecting the end of the continuous transmission from the position indicator 50, the microprocessor 58 enters operation of detecting the timing of the start signal transmitted prior to writing pressure data (step 2). The microprocessor 58 carries out control to repeatedly activate the sample/hold circuit 56 and the AD conversion circuit 57 in the state in which the electrode X11 is selected, and stores the time when the signal level becomes equal to or higher than the above-described predetermined value as t1. The microprocessor 58 starts operation of receiving data from the position indicator from the time after awaiting for a certain time Tw from the time t1 (step 2). The time Tw is set to a time until the signal level received by the tablet becomes almost zero after the end of transmission of the start signal from the position indicator 50, and is set to a time obtained in advance.

The microprocessor 58 activates a timer that is not diagrammatically shown simultaneously with the reaching of the above-described waiting time to Tw. The timer repeatedly counts from zero to a value corresponding with the above-described time of Td (cycle of data transmission from the position indicator) (step 2). During the operation period of one cycle of the timer, the microprocessor 58 repeatedly activates the sample/hold circuit 56 and the AD conversion circuit 57 to read the signal level. If the signal level during this period has never reached the above-described predetermined value, the microprocessor 58 determines that transmission from the position indicator 50 is absent and stores the data of this round as "0." If a signal level equal to or higher than the predetermined value is detected in this period, the microprocessor 58 determines that transmission from the position indicator is present and stores the data of this round as "1" (step 2).

The microprocessor 58 carries out the counting of the above-described timer 11 times and stores an 11-bit data. This 11-bit data corresponds to the 11-bit data shown in FIG. 3. The first 10 bits are the writing pressure data and the last one bit is the electricity remaining amount information. In FIG. 8, a case in which the writing pressure data is "1010111010" and the electricity remaining amount information is "1" is shown.

The microprocessor 58 recognizes the remaining amount of the power supply of the electric double-layer capacitor of the position indicator from past data and the data received this time, of the last data of the stored 11-bit data, i.e. the battery remaining amount information. Specifically, the microprocessor 58 determines whether or not the battery remaining amount information of the last data of the stored 11-bit data is "1." If the battery remaining amount information is "1," the microprocessor 58 detects the time interval between the past timing at which the battery remaining amount information that is "1" is received and the present reception timing and detects the frequency at which the battery remaining amount information is transmitted as "1" from the time interval. Then, the microprocessor 58 recognizes the remaining amount of the power supply of the electric double-layer capacitor 14 of the position indicator by estimating the number of times of pulse shown in FIG. 4 corresponding to the detected frequency and determining the voltage of the electric double-layer capacitor corresponding to the estimated number of times of pulse. The microprocessor 58 may store in advance a correspondence table between the time interval between the past timing at which the battery remaining amount information that is "1" is received and the present reception timing and the remaining amount of the power supply of the electric double-layer capacitor, and recognize the remaining amount of the power supply of the electric double-layer capacitor 14 from the correspondence table.

Figure 9:
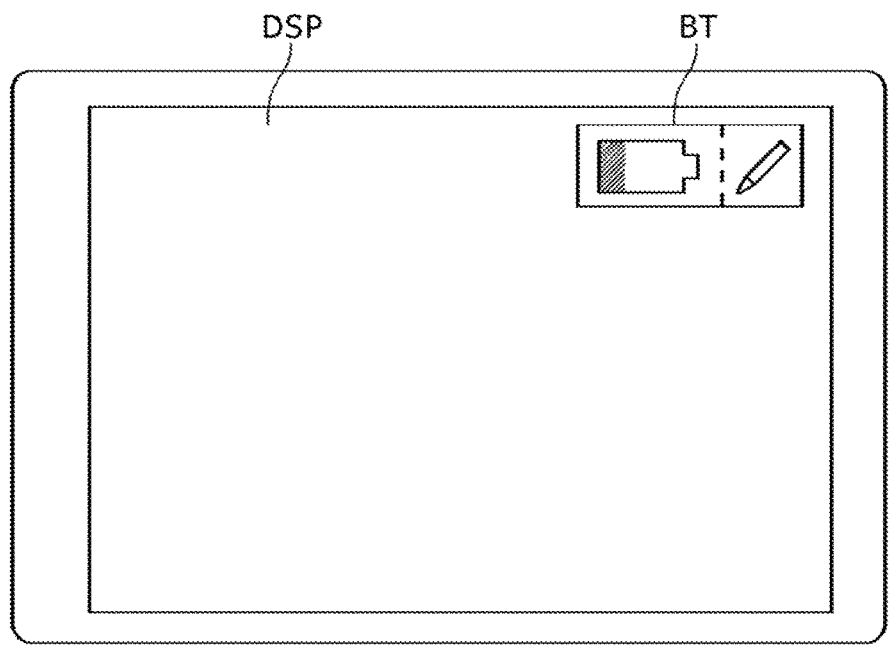
FIG. 9 is a diagram showing a display example of the remaining amount of a power supply in the position detecting device of the first embodiment of the present disclosure.

Furthermore, on the basis of the recognition result of the remaining amount of the power supply, for example as shown in FIG. 9, the microprocessor 58 displays the remaining amount of the power supply of the position indicator with change at plural levels or continuous change at a display part BT of the remaining amount of the power supply of the position indicator, provided at the upper part of a display screen DSP of the display device of the tablet of the present embodiment.

Figure 10:
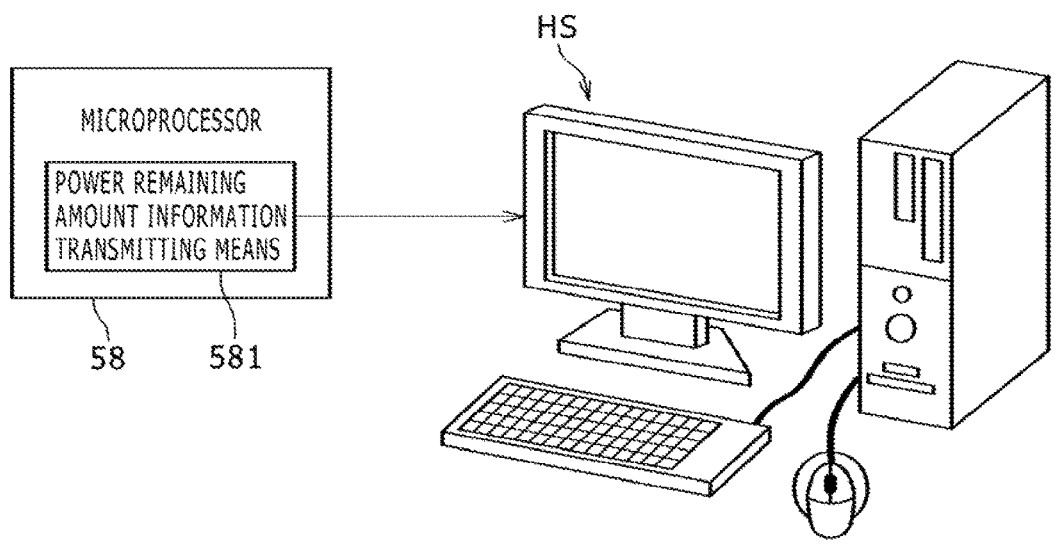
FIG. 10 is a diagram showing the configuration to supply, to a host computer, information on the remaining amount of the power supply in the position detecting device of the first embodiment of the present disclosure.

Furthermore, if the tablet is connected to a host computer, as shown in FIG. 10, the microprocessor 58 may include electricity remaining amount information transmitting means 581 that transmits the detected electricity remaining amount of the position indicator to the host computer. In this case, on the basis of the received electricity remaining amount of the position indicator, the host computer can display the electricity remaining amount of the position indicator on a screen of its display device.

Although diagrammatic representation is omitted, the microprocessor 21 of the position indicator can grasp the number of times of pulse supplied to the switch 18 and thus can recognize the voltage of the electric double-layer capacitor 14 from the characteristic diagram of FIG. 4. Therefore, it is also possible to provide a display unit formed of an LCD or an organic EL display element at a proper position on the side circumferential surface of the chassis of the position indicator itself and display the remaining amount of the power supply of the electric double-layer capacitor 14 on a display screen of the display unit.

In step 2, the electrode with which the maximum level is detected (X11) is selected among the X-electrodes and data is received. However, the electrode with which the maximum level is detected (Y20) may be selected among the Y-electrodes and data may be received.

Upon ending the reception of 11-bit data in step 2, the microprocessor 58 makes transition to the operation of detecting the start of the period of the continuous transmission from the position indicator (step 1) and repeatedly carries out the operation of FIG. 8.

Next, a method for obtaining the coordinate position of the position indicator 50 from the reception level obtained in the above-described step 1 will be described.

From the reception levels VPX, VAX, VBX, VPY, VAY, and VBY obtained in step 1, coordinate values (X, Y) of the position indicator 50 are each calculated according to the following expressions.

$$X=Px+(Dx/2)\times((VBX-VAX)/(2\times VPX-VAX-VBX)) \quad \text{(expression 1)}$$

In this expression, Px is the coordinate position of the X-electrode with which the maximum level is detected (here, X11) on the X-axis, and Dx is the arrangement pitch between the X-electrodes.

$$Y=Py+(Dy/2)\times((VBY-VAY)/(2\times VPY-VAY-VBY)) \quad \text{(expression 2)}$$

In this expression, Py is the coordinate position of the Y-electrode with which the maximum level is detected (here, Y20) on the Y-axis, and Dy is the arrangement pitch between the Y-electrodes.

According to the position indicator in accordance with the present embodiment, measurement of the remaining amount of the power supply stored in the electric double-layer capacitor 14 and voltage conversion of the power supply can be carried out in common. Thus, there are advantages that the configuration of the circuit can be simplified and the consumption current can be suppressed to a small current.

Furthermore, the battery remaining amount at plural levels can be represented in the tablet by only adding one bit as information transmitted from the position indicator to the tablet. Thus, the transfer rate of data from the position indicator is not lowered.

In the present embodiment, it is preferable to reduce voltage variation of the capacitor 19 by adjusting constants of the coils 171 and 172 and the capacitor 173 in the voltage conversion circuit 17 and adjusting the width of the pulse to control the switch 18.

In the explanation of the above-described embodiment, it is assumed that the position indicator according to the present embodiment repeats the operation of FIG. 3. However, the position indicator may stop transmission for a while after ending one time of operation and another operation, specifically e.g. detection of the position of touch by a finger, may be carried out in the tablet during the transmission stop.

Furthermore, in the explanation of the above-described embodiment, the information transmitted from the position indicator is only the writing pressure and the electricity remaining amount information. However, the number of bits to be transmitted may be increased and another kind of information specifically e.g. operation information of the switch and so forth, may be transmitted.

In addition, in the explanation of the above-described embodiment, the writing pressure information of the position indicator is represented by a binary code and is transmitted by ASK modulation. However, the transmission frequency may be changed according to the writing pressure.

Moreover, in the explanation of the above-described embodiment, control of the position indicator is carried out by the microprocessor 21. However, the control may be carried out by using a logic circuit instead of the microprocessor.

Furthermore, in the explanation of the above-described embodiment, the number of electrodes selected by the selection circuit 52 is only one. However, adjacent plural electrodes may be simultaneously selected. Furthermore, the electrode may be selected about each of the X-electrode group and the Y-electrode group. In addition, an amplification circuit, a band-pass filter circuit, a detection circuit, a sample/hold circuit, and an AD conversion circuit may be provided on each of the X-electrode side and the Y-electrode side and detection may be simultaneously carried out.

Moreover, in the explanation of the above-described embodiment, the electrode 12 is provided in the position indicator and the coordinate position is obtained according to capacitive coupling with the tablet. However, position detection according to electromagnetic induction with the tablet may be carried out by providing a coil instead of the electrode 12 and causing an AC current to flow in the coil. In this case, the configuration of the tablet differs only in that what are arranged in the tablet sensor 51 are not electrodes and loop coils are arranged in the X-direction and the Y-direction, and the other operations are exactly the same. In this case, the coil provided instead of the electrode 12 may be common with the coil 15 for charging or may be a different coil.

Second Embodiment

Figure 11:
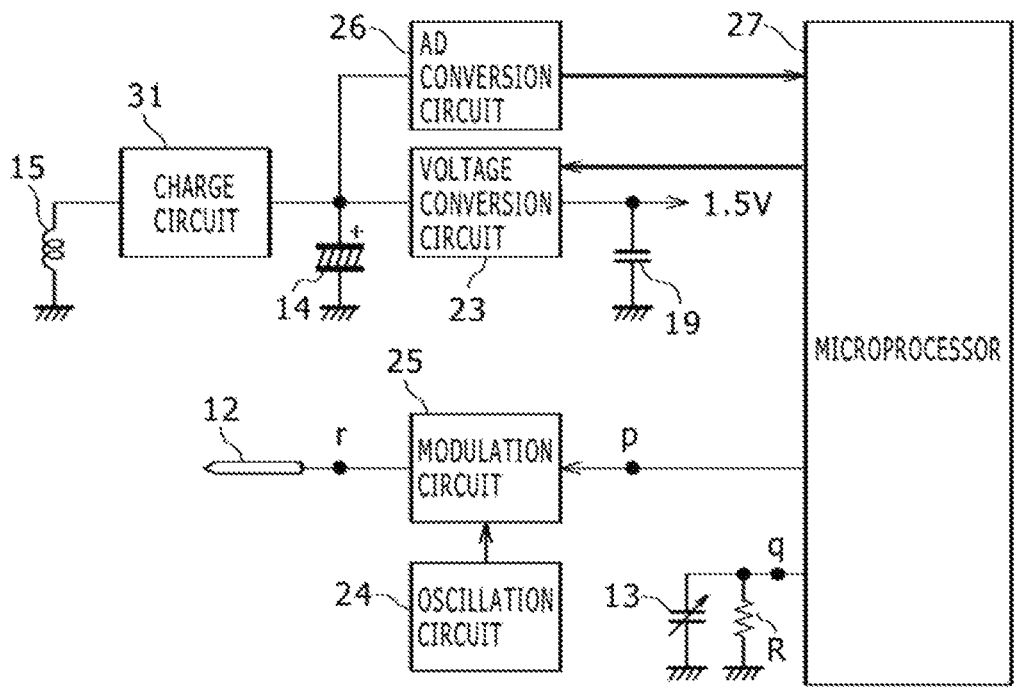
FIG. 11 is a diagram showing the circuit configuration of a position indicator according to a second embodiment of the present disclosure.

FIG. 11 is a diagram showing the circuit configuration of a position indicator according to a second embodiment of the present disclosure. The internal structure of the position indicator of the present embodiment is the same as that of FIG. 1. In FIG. 11, components having the same configuration as the position indicator according to the first embodiment are shown by the same numerals as those in FIG. 2. Specifically, 12 is an electrode, 13 is a variable-capacitance capacitor, and 14 is an electric double-layer capacitor. 15 is a coil and 19 is a capacitor. Furthermore, 31 is a charge circuit and it is a circuit that charges the electric double-layer capacitor 14 by an electromotive force induced in the coil 15.

23 is a voltage conversion circuit and it generates a constant voltage from power supply stored in the electric double-layer capacitor 14 to store the voltage in the capacitor 19. Suppose that the constant voltage stored in the capacitor 19 is 1.5 V also in the present embodiment. This voltage conversion circuit 23 may have the same configuration as the voltage conversion circuit 17 in FIG. 2 or may have another configuration.

24 is an oscillation circuit and 25 is an ASK modulation circuit. They may have the same circuit configuration as the oscillation circuit 22 in FIG. 2 or may have another configuration.

The present embodiment is different from the configuration of the first embodiment in that the voltage of the electric double-layer capacitor 14 is detected by an AD conversion circuit 26 and a microprocessor 27 reads the voltage. In the present embodiment, the timings of signals transmitted from the electrode 12 and writing pressure detection operation by the variable-capacitance capacitor 13 are exactly the same as those shown in FIG. 3.

In the present embodiment, the microprocessor 27 changes the frequency at which the electricity remaining amount information shown in FIG. 3 is set to "1" according to the voltage obtained by the AD conversion circuit 26. For example, if the voltage range of the electric double-layer capacitor 14 is represented at 10 levels (n=1 to 10), when the detected value is n, the microprocessor 27 transmits the electricity remaining amount information as "1" only one time every time the operation of FIG. 3 is carried out n times.

Although the electric double-layer capacitor is used as a power supply of the position indicator in the present embodiment, a chargeable battery may be used.

Although control of the position indicator is carried out by the microprocessor 27 in the present embodiment, the control may be carried out by using a logic circuit instead of the microprocessor.

Third Embodiment

Figure 12:
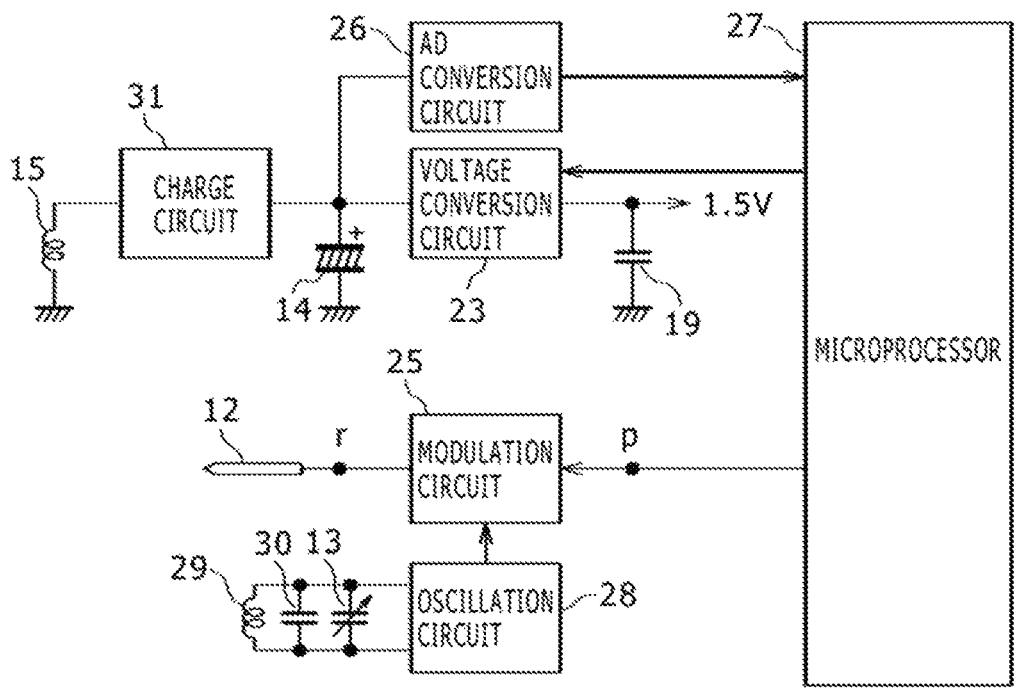
FIG. 12 is a diagram showing the circuit configuration of a position indicator according to a third embodiment of the present disclosure.

FIG. 12 is a diagram showing the circuit configuration of a position indicator according to a third embodiment of the present disclosure. In the present embodiment, an example in which the frequency of a signal to be transmitted is changed according to the writing pressure will be shown. In FIG. 12, components having the same configuration as the position indicator according to the second embodiment are shown by the same numerals as those in FIG. 11. Specifically, 12 is an electrode, 13 is a variable-capacitance capacitor, and 14 is an electric double-layer capacitor. 15 is a coil, 19 is a capacitor, and 23 is a voltage conversion circuit. 25 is an ASK modulation circuit, 26 is an AD conversion circuit, and 27 is a microprocessor. Furthermore, 31 is a charge circuit and it is a circuit that charges the electric double-layer capacitor 14 by an electromotive force induced in the coil 15.

28 is an oscillation circuit and it oscillates at a resonant frequency according to a coil 29, a capacitor 30, and the variable-capacitance capacitor 13. The variable-capacitance capacitor 13 is the same as that used in the first embodiment and the second embodiment and the capacitance changes depending on the writing pressure. In the present embodiment, the variable-capacitance capacitor 13 is provided in the resonant circuit in the oscillation circuit 28 and thus the frequency of the signal transmitted from the electrode 12 changes according to the applied writing pressure. Also in the present embodiment, the internal structure of the position indicator is the same as that of FIG. 1.

Figure 13:
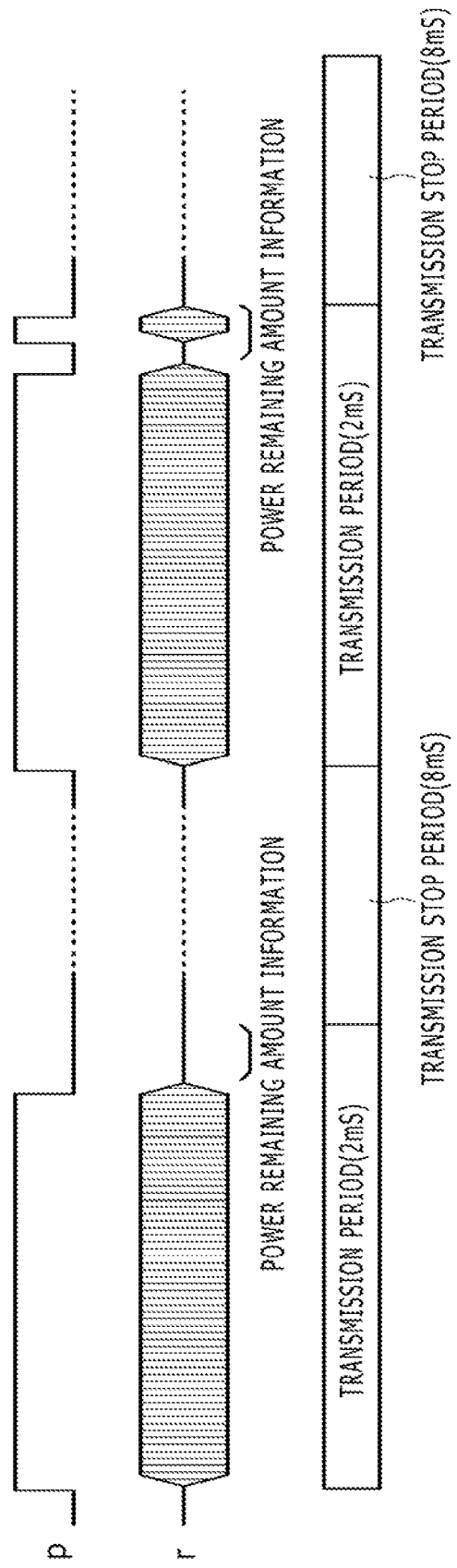
FIG. 13 is a diagram showing the operation of the position indicator according to the third embodiment of the present disclosure.

FIG. 13 is a diagram showing the operation of the position indicator in the present embodiment and shows how a signal (p) and a signal (r) in FIG. 12 change. The microprocessor 27 controls the signal (p) to alternately repeat a transmission period (e.g. 2 msec) and a transmission stop period (e.g. 8 msec). At the last of each transmission period, electricity remaining amount information represented by one bit is transmitted after the transmission is temporarily stopped.

The electricity remaining amount information in this case is transmitted by the microprocessor 27 in exactly the same manner as the second embodiment. Specifically, the microprocessor 27 changes the frequency at which the electricity remaining amount information is set to "1" according to the voltage of the electric double-layer capacitor 14 detected by the AD conversion circuit 26.

The point that the frequency of the signal transmitted in the transmission period changes according to the writing pressure applied to the variable-capacitance capacitor 13 is a characteristic of the present embodiment.

Figure 14:
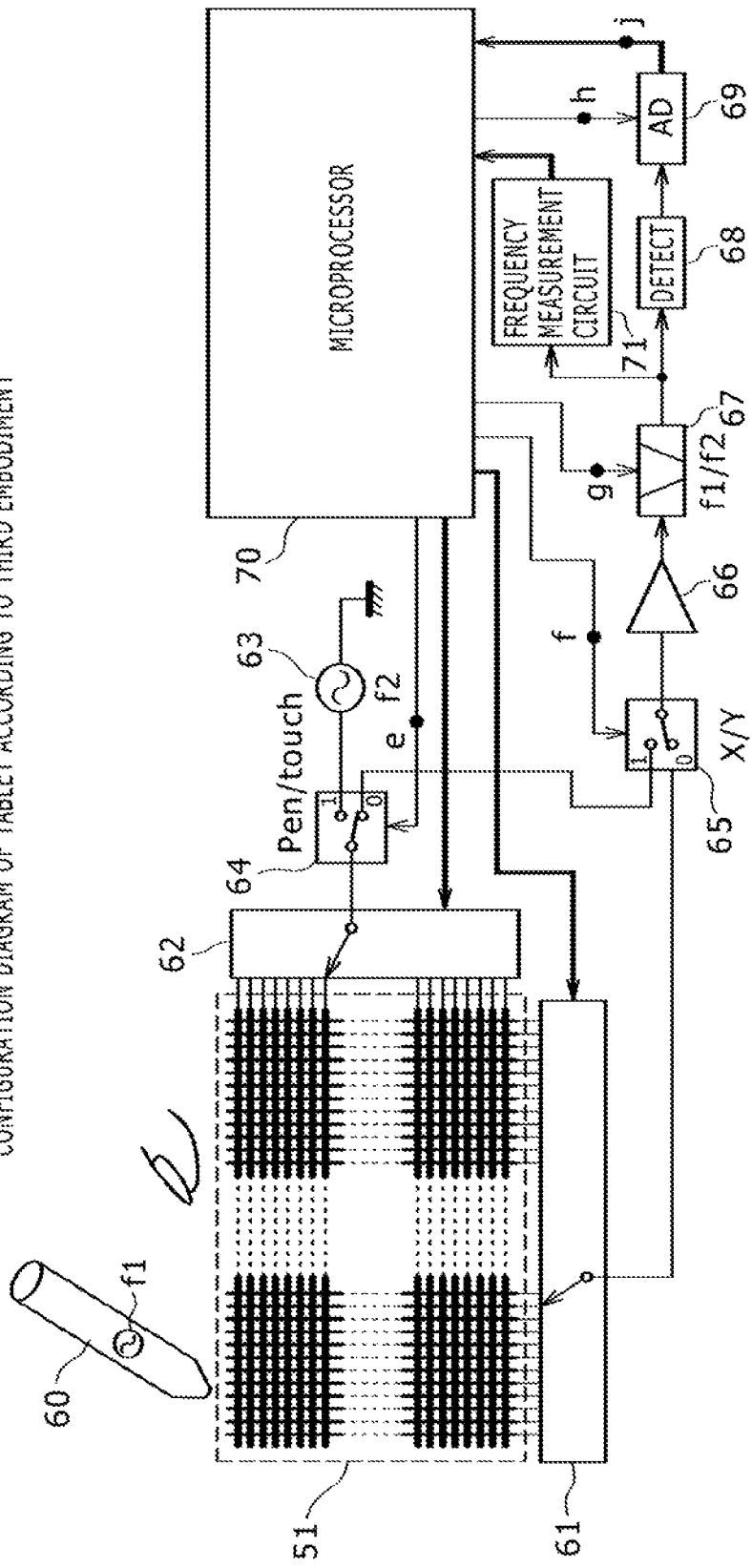
FIG. 14 is a diagram showing the configuration of a tablet according to the third embodiment of the present disclosure.

FIG. 14 is a configuration diagram of a tablet used in the present embodiment. In the tablet of the present embodiment, according to the premise that the cycle of intermittent signal transmission from the position indicator is known, the coordinates and writing pressure of the position indicator are obtained in the transmission period of the position indicator and the position of touch by a finger is detected in the transmission stop period.

In FIG. 14, 60 is a position indicator with the same configuration as that shown in FIG. 12 and the frequency of a signal transmitted from the position indicator 60 is defined as f1. 51 is the same tablet sensor as that used in the first embodiment. 61 is an X-selection circuit that selects one electrode from an X-electrode group and 62 is a Y-selection circuit that selects one electrode from a Y-electrode group. 63 is an oscillator for supplying a transmission signal to the Y-electrode when the tablet of the present embodiment is operated as touch detection and the oscillation frequency is defined as f2. 64 is a switching circuit and it switches whether the Y-electrode selected by the Y-selection circuit 62 is connected to the oscillator 63 or the side of an amplification circuit to be described later. Specifically, when the tablet of the present embodiment is operated as the tablet for touch detection, a control signal e from a microprocessor 70 to the switching circuit 64 is set to a high level (1) to select the side of the oscillator 63. Furthermore, when the tablet of the present embodiment detects the position indicator 60, the microprocessor 70 sets the control signal e to a low level (0) to select the amplification circuit side.

65 is a switching circuit and it selects either the X-electrode selected by the X-selection circuit 61 or the Y-electrode selected by the Y-selection circuit 62 via the switching circuit 64 and connects the selected electrode to an amplification circuit 66. Specifically, when the tablet of the present embodiment is operated as the tablet for touch detection, the microprocessor 70 sets a control signal f to the switching circuit 65 to a low level (0) to select the side of the X-selection circuit 61. Furthermore, when the tablet of the present embodiment carries out operation of detecting the position indicator 60 and obtains the X-axis coordinate of the position indicator 60, the microprocessor 70 sets the control signal f to the low level (0) to select the side of the X-selection circuit 61. Moreover, when the tablet of the present embodiment carries out operation of detecting the position indicator 60 and obtains the Y-axis coordinate of the position indicator 60, the microprocessor 70 sets the control signal f to a high level (1) to select the side of the Y-selection circuit 62.

The output of the amplification circuit 66 is connected to a band-pass filter circuit 67 having a predetermined bandwidth centered at the frequency f1 or the frequency f2. The center frequency of the band-pass filter circuit 67 is switched by a control signal g from the microprocessor 70. The center frequency is so switched as to become the frequency f1 when the tablet of the present embodiment carries out operation of detecting the position indicator 60 and become the frequency f2 when the tablet carries out touch detection operation. The bandwidth when the band-pass filter circuit 67 operates with the frequency f1 as the center frequency is set sufficiently large compared with the width of change in the transmission frequency due to change in the writing pressure of the position indicator 60.

An output signal of the band-pass filter circuit 67 is detected by a detection circuit 68 and is converted to a digital value by an AD conversion circuit 69 on the basis of a control signal h from the microprocessor 70. Digital data j from the AD conversion circuit 69 is read and processed by the microprocessor 70.

The output signal of the band-pass filter circuit 67 is supplied also to a frequency measurement circuit 71. The frequency measurement circuit 71 measures the frequency of the signal supplied thereto in detail and supplies the measured frequency information to the microprocessor 70. As the configuration of the frequency measurement circuit 71, a counter circuit may be provided and the number of waves of the signal input in a certain time may be counted. Alternatively, a comparator may be provided and the time during which a predetermined number of times of rising-up or falling-down of the input signal are counted may be measured. In the microprocessor 70, the writing pressure information of the position indicator 60 is obtained on the basis of the frequency information from the frequency measurement circuit 71.

FIG. 15 is a diagram showing operation of obtaining the coordinate position and the electricity remaining amount of the electric double-layer capacitor 14 according to the position indicator 60 of the present embodiment. An approximate position of the position indicator 60 over the tablet sensor 51 can be detected similarly to the first embodiment. Specifically, the microprocessor 70 sets the control signal e to the switching circuit 64 to the low level (0) and transmits the control signal g to cause the center frequency of the band-pass filter circuit 67 to become the frequency f1. Thus, the microprocessor 70 can obtain the approximate position of the position indicator 60 over the tablet sensor 51 in the same manner as that of FIGS. 6 and 7. In the present embodiment, description will be made according to the assumption that the position indicator 60 exists near the intersection of the electrode X11 and the electrode Y20.

The microprocessor 70 sets the control signal f to the switching circuit 65 to the low level (0). Then, in the state in which the electrode X11 is selected, when the signal level output from the AD conversion circuit 69 is equal to or higher than a predetermined value for a certain time (Ts) continuously, the microprocessor 70 determines that the continuous transmission period of the position indicator 60 is started and makes transition to coordinate detection operation (step 1 in FIG. 15). In order to obtain the X-coordinate of the signal from the position indicator 60, the X-selection circuit 61 sequentially selects five electrodes centered at the electrode X11 (X9 to X13) and the microprocessor 70 operates the AD conversion circuit 69 to read the signal level (step 1). At this time, the microprocessor 70 stores the number of the electrode from which the highest signal level is detected (here, X11), the signal level thereof (VPX), and levels VAX and VBX detected with both adjacent electrodes of this electrode (step 1).

Next, in order to obtain the Y-coordinate of the signal from the position indicator 60, the microprocessor 70 sets the control signal f to the switching circuit 65 to the high level (1) to select the side of the Y-selection circuit 62. The Y-selection circuit 62 sequentially selects five electrodes centered at Y20 (Y18 to Y22) and the microprocessor 70 reads the signal level (step 1). At this time, the microprocessor 70 stores the number of the electrode from which the highest signal level is detected (here, Y20), the signal level thereof (VPY), and levels VAY and VBY detected with both adjacent electrodes of this electrode (step 1). From the signal levels VPX, VAX, VBX, VPY, VAY, and VBY obtained here, the microprocessor 70 calculates the coordinate position of the position indicator 60 by using the above-described (expression 1) and expression (2).

Subsequently, the microprocessor 70 carries out operation for waiting for the end of the period of the continuous transmission from the position indicator 60. The microprocessor 70 sets the control signal f to the switching circuit 65 to the low level (0) and carries out control to cause the X-selection circuit 61 to select the electrode X11, from which a peak is detected in the above-described coordinate detection operation. At this time, the time at which the received signal level falls below the predetermined value is the end time of the continuous transmission from the position indicator 60 (step 1).

Upon detecting the end of the period of the continuous transmission from the position indicator 60, the microprocessor 70 receives a signal for a predetermined time (time from the end of the continuous transmission period to the end of transmission of the electricity remaining amount information in FIG. 13) in the state in which the electrode X11 is selected. If the signal at a level equal to or higher than a predetermined value is detected in this period, the microprocessor 70 stores the electricity remaining amount information from the position indicator 60 as "1." If the signal at a level equal to or higher than the predetermined value is not detected, the microprocessor 70 stores the electricity remaining amount information as "0." FIG. 15 shows a case in which the electricity remaining amount information is "1" (step 2).

Upon the end of the reception of the electricity remaining amount information, the position indicator 60 enters the transmission stop period (FIG. 13) and thus the tablet of the present embodiment carries out touch detection operation in this period. The tablet of the present embodiment ends this touch detection operation before the start of the next transmission from the position indicator 60 and carries out the operation shown in FIG. 15 again, to alternately repeat the operation of detecting the position indicator 60 and the touch detection operation. At this time, the microprocessor 70 can obtain the remaining amount of the power supply stored in the electric double-layer capacitor 14 from the frequency at which the electricity remaining amount information from the position indicator is detected as "1."

The touch detection operation in the tablet of the present embodiment is carried out as follows. The microprocessor 70 sets the control signal e to the switching circuit 64 to the high level (1) and sets the control signal f to the switching circuit 65 to the low level (0), and transmits the control signal g to cause the center frequency of the band-pass filter circuit 67 to become the frequency f2. In this state, a transmission signal from the oscillator 63 is received according to capacitive coupling at the intersection of the X-electrode and the Y-electrode and its signal level is obtained by the AD conversion circuit 69 (step 3). The microprocessor 70 carries out control over the X-selection circuit 61 and the Y-selection circuit 62 and obtains the signal levels according to the capacitive coupling at all intersections of the X-electrode and the Y-electrode. In the tablet of the present embodiment, the signal level at each intersection when a finger is absent (reference level) is obtained in advance. Thus, by comparing the reception level when each intersection of the X-electrode and the Y-electrode is selected with the reference level, it can be determined whether a finger is present or absent near the selected intersection (step 3).

Although the above-described touch detection operation needs to be carried out in the transmission stop period of the position indicator 60 (in this example, 8 msec), the selection of the intersections of the X-electrode and the Y-electrode may be carried out in plural batches.

Although the electric double-layer capacitor is used as a power supply of the position indicator in the present embodiment, a chargeable battery may be used.

Although the frequency of the signal to be transmitted is changed by the variable-capacitance capacitor 13 in the present embodiment, the frequency may be changed by varying the inductance of the coil 29.

Other Embodiments or Modification Examples

In the above-described embodiments, the position indicator transmits the remaining amount information to the tablet as a partial bit of the position indicator information. However, the position indicator may transmit the remaining amount information to the tablet separately from the position indicator information independently.

Furthermore, although one-bit information is employed as the remaining amount information, the remaining amount information may be two or more bits, of course, because it suffices that the remaining amount information can be changed at a change frequency according to the detected remaining amount of the power supply (electricity remaining amount).

DESCRIPTION OF REFERENCE NUMERALS

11 Pen core
12 Electrode
13 Variable-capacitance capacitor
14 Electric double-layer capacitor
15, 29 Coil
16 Printed board
17, 23 Voltage conversion circuit
18 Switch
19, 30 Capacitor
20 Voltage detector
21, 27, 58, 70 Microprocessor
22, 24, 28 Oscillation circuit
25 ASK modulation circuit
26, 57, 69 AD conversion circuit
50, 60 Position indicator
51 Tablet sensor
52 Selection circuit
53, 66 Amplification circuit
54, 67 Band-pass filter circuit
55, 68 Detection circuit
56 Sample/hold circuit
61 X-selection circuit
62 Y-selection circuit
63 Oscillator
64, 65 Switching circuit
71 Frequency measurement circuit

The invention claimed is:
1. A position detecting device comprising:
a position indicator that includes:
a power storage device including an electric double-layer capacitor;
a charge circuit, which, in operation, charges the power storage device;
a voltage conversion circuit, which, in operation, converts a voltage stored in the power storage device to a voltage of a predetermined value and outputs the voltage of the predetermined value;
a voltage detecting circuit that detects whether the voltage output by the voltage conversion circuit reaches the predetermined value;
a voltage control circuit, which, in operation, supplies the voltage conversion circuit with a control signal that causes the voltage output from the voltage conversion circuit to become the predetermined value when the voltage detecting circuit does not detect that the voltage output circuit reaches the predetermined value, wherein the voltage conversion circuit includes a switch and a capacitor, and the voltage conversion circuit, in operation, controls switching of the switch using the control signal supplied by the voltage control circuit and causes the capacitor to have the voltage of the predetermined value via movement of a charge stored in the electric double-layer capacitor to the capacitor, and wherein the control signal from the voltage control circuit that controls switching of the switch is a pulse signal;

an electricity remaining amount detecting circuit, which, in operation, detects an electricity remaining amount of the power storage device based on the control signal supplied by the voltage control circuit, wherein the electricity remaining amount detecting circuit, in operation, detects the electricity remaining amount based on a frequency of the pulse signal supplied to the switch of the voltage conversion circuit; and a transmitter, which, in operation, transmits, to the tablet, remaining amount information that is based on the detected electricity remaining amount of the power storage device, wherein the transmitter, in operation, includes the remaining amount information in part of position indicator information represented by a binary code and transmits the position indicator information to the tablet, and the remaining amount information is included in the position indicator information by changing a frequency at which a specific bit of the position indicator information is set to a predefined value according to the electricity remaining amount detected by the electricity remaining amount detecting circuit, and a tablet that includes:
  a receiver, which, in operation, receives the remaining amount information from the position indicator, and detects the electricity remaining amount of the power storage device based on the remaining amount information that is received,
  wherein the receiver, in operation, receives the position indicator information from the position indicator and detects the electricity remaining amount of the power storage device from the frequency at which the specific bit of the position indicator information that is receive is the predefined value.

2. The position detecting device according to claim 1, comprising:
an alternating current signal generating circuit, which, in operation, generates an alternating current signal,
wherein the transmitter includes a modulation circuit, which, in operation, modulates the alternating current signal according to the position indicator information represented by the binary code.

3. A position indicator comprising:
a power storage device including an electric double-layer capacitor;
a charge circuit, which, in operation, charges the power storage device;
a voltage conversion circuit, which, in operation, converts a voltage stored in the power storage device to a voltage of a predetermined value and outputs the voltage;
a voltage detecting circuit, which, in operation, detects whether the voltage output by the voltage conversion circuit reaches the predetermined value;
a voltage control circuit, which, in operation, supplies the voltage conversion circuit with a control signal that causes the voltage output from the voltage conversion circuit to become the predetermined value when the voltage detecting circuit does not detect that the voltage output by the voltage conversion circuit reaches the predetermined value,
wherein the voltage conversion circuit includes a switch and a capacitor, and the voltage conversion circuit, in operation, controls switching of the switch using the control signal supplied by the voltage control circuit and causes the capacitor to have the voltage of the predetermined value via movement of a charge stored in the electric double-layer capacitor to the capacitor, and
wherein the control signal used to control switching of the switch is a pulse signal;
an electricity remaining amount detecting circuit, which, in operation, detects an electricity remaining amount of the power storage device based on the control signal supplied by the voltage control circuit,
wherein the electricity remaining amount detecting circuit, in operation, detects the electricity remaining amount based on a frequency of the pulse signal supplied to the switch, and
wherein electricity remaining amount information is included in position indicator information by changing a frequency at which a specific bit of the position indicator information is set to a predefined value according to the electricity remaining amount detected by the electricity remaining amount detecting circuit; and
a transmitter, which, in operation, transmits the electricity remaining amount detected by the electricity remaining amount detecting circuit to a tablet,
wherein the transmitter, in operation, includes the electricity remaining amount information in part of position indicator information represented by a binary code and transmits the position indicator information to the tablet.

4. The position indicator according to claim 3, comprising:
an alternating current signal generating circuit, which, in operation, generates an alternating current signal,
wherein the transmitter includes a modulation circuit, which, in operation, modulates the alternating current signal according to the position indicator information represented by the binary code.

5. A position detecting device comprising:
a position indicator that includes:
  an electric double-layer capacitor;
  a charge circuit, which, in operation, charges the electric double-layer capacitor;
  a voltage conversion circuit, which, in operation, converts a voltage stored in the electric double-layer capacitor to a predetermined voltage and generates a voltage of a predetermined value using at least one switch;
  a voltage detecting circuit, which, in operation, detects whether a voltage output by the voltage conversion circuit reaches the predetermined value;
  a voltage control circuit, which, in operation, supplies a pulse signal to the at least one switch when the voltage detecting circuit does not detect that the voltage output by the voltage conversion circuit reaches the predetermined value, and counts a number of times of transmission of the pulse signal output by the voltage control circuit;

an alternating current signal generating circuit, which, in operation, generates an alternating current signal; and a modulation circuit, which, in operation, modulates the alternating current signal according to position indicator information represented by a binary code, and sets a specific bit of the position indicator information to a predefined value every time the number of times of transmission of the pulse signal counted by the voltage control circuit reaches a predetermined number of times; and a tablet that includes:

a receiver, which, in operation, receives the position indicator information from the position indicator and detects an electricity remaining amount of the electric double-layer capacitor from a frequency at which the specific bit of the position indicator information is set to the predefined value.

6. The position detecting device according to claim 5, wherein the modulation circuit, in operation, represents the position indicator information by amplitude shift keying (ASK) modulation of the alternating current signal according to the position indicator information.

7. The position detecting device according to claim 6, wherein the modulation circuit, in operation, represents the position indicator information by ASK modulation of the alternating current signal during a data transmission period, does not represent the position indicator information by ASK modulation of the alternating current signal during a data transmission period, and alternately repeats the data transmission period and the continuous transmission period.

8. The position detecting device according to claim 5, wherein the position indicator includes a writing pressure detecting circuit, which, in operation, detects a writing pressure and converts the writing pressure to writing pressure information of a predetermined number of bits, and the writing pressure information is included in the position indicator information.

9. The position detecting device according to claim 8, wherein the alternating current signal generating circuit, in operation, changes a frequency of the alternating current signal according to the writing pressure detected by the writing pressure detecting circuit.

10. The position detecting device according to claim 5, wherein the tablet includes a display device, which, in operation, displays an indication of the detected electricity remaining amount of the position indicator.

11. The position detecting device according to claim 5, wherein the tablet includes a transmitter, which, in operation, transmits the detected electricity remaining amount of the position indicator to a host computer.

12. A position indicator comprising:

an electric double-layer capacitor;

a charge circuit, which, in operation, charges the electric double-layer capacitor;

a voltage conversion circuit, which, in operation, converts a voltage stored in the electric double-layer capacitor to a predetermined voltage and generates a voltage of a predetermined value by using at least one switch;

a voltage detecting circuit, which, in operation, detects whether a voltage output by the voltage conversion circuit reaches the predetermined value;

a voltage control circuit, which, in operation, supplies a pulse signal to the switch when the voltage detecting circuit does not determine that the voltage output by the voltage conversion circuit reaches the predetermined value, and counts a number of times of transmission of the pulse signal output by the voltage control circuit;

an alternating current signal generating circuit, which, in operation, generates an alternating current signal; and a modulation circuit, which, in operation, modulates the alternating current signal according to position indicator information represented by a binary code, and sets a specific bit of the position indicator information to a predefined value every time the number of times of pulse transmission counted by the voltage control circuit reaches a predetermined number of times.

13. The position indicator according to claim 12, wherein the modulation circuit, in operation, represents the position indicator information by amplitude shift keying (ASK) modulation of the alternating current signal according to the position indicator information.

14. The position indicator according to claim 13, wherein the modulation circuit, in operation, represents the position indicator information by ASK modulation of the alternating current signal during a data transmission period, does not represent the position indicator information by ASK modulation of the alternating current signal during a data transmission period, and alternately repeats the data transmission period and the continuous transmission period.

15. The position indicator according to claim 12, comprising:

a writing pressure detecting circuit, which, in operation, detects a writing pressure and converts the writing pressure to writing pressure information of a predetermined number of bits, wherein the writing pressure information is included in the position indicator information.

16. The position indicator according to claim 15, wherein the alternating current signal generating circuit, in operation, changes a frequency of the alternating current signal according to the writing pressure detected by the writing pressure detecting circuit.

* * * * *